United States Patent
Oberman et al.

(10) Patent No.: US 6,487,653 B1
(45) Date of Patent: Nov. 26, 2002

(54) METHOD AND APPARATUS FOR DENORMAL LOAD HANDLING

(75) Inventors: Stuart F. Oberman; Stephan G. Meier, both of Sunnyvale; Jeffrey E. Trull, San Jose, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/383,138

(22) Filed: Aug. 25, 1999

(51) Int. Cl.$^7$ ................................................. G06F 7/38
(52) U.S. Cl. ...................................... 712/222; 708/508
(58) Field of Search ........................ 712/222; 708/495, 708/496, 497, 508

(56) References Cited

U.S. PATENT DOCUMENTS

| | | | | |
|---|---|---|---|---|
| 5,058,048 A | * | 10/1991 | Gupta | 708/508 |
| 5,646,875 A | * | 7/1997 | Taborn | 708/508 |
| 5,768,169 A | | 6/1998 | Sharangpani | 708/495 |
| 5,903,479 A | * | 5/1999 | Schwarz | 708/205 |
| 5,940,311 A | * | 8/1999 | Dao | 708/204 |
| 6,275,838 B1 | * | 8/2001 | Blomgren | 708/501 |

\* cited by examiner

*Primary Examiner*—Eric Coleman
(74) *Attorney, Agent, or Firm*—Conley, Rose & Tayon, PC; B. Noël Kivlin

(57) ABSTRACT

A microprocessor configured to dynamically switch its floating point load pipeline length from one stage in length to more than one stage in length is disclosed. The microprocessor may perform normal loads and detect denormal loads in a single clock cycle. The microprocessor temporarily stores each scheduled floating point instruction in a reissue buffer for at least one clock cycle. When a denormal load instruction is detected, the microprocessor is configured to add one or more stages to the floating point load pipeline to allow the denormal value to complete the conversion to an internal format. The longer pipeline is then used for all loads that follow the denormal load until there is an idle clock cycle or an abort occurs. At that point, the pipeline reverts back to its original shorter state. In addition, the microprocessor may be configured to cancel instructions scheduled assuming the denormal load would take only one clock cycle to complete. The canceled instruction is then "replayed" during a later clock cycle from the reissue buffer. A method for performing denormal loads and a computer system are also disclosed.

23 Claims, 10 Drawing Sheets

Normalization

Single Precision (32-Bit)

Single Precision Denormal

Internal Format Denormal

After First Cycle

After Second Cycle

After Third And Final Cycle

METHOD AND APPARATUS FOR DENORMAL LOAD HANDLING

BACKGROUND OF THE INVENTION

1. Field of the Invention

This invention relates generally to the field of microprocessors and, more particularly, to floating point units within microprocessors.

2. Description of the Related Art

Most microprocessors must support multiple data types. For example, x86-compatible microprocessors must execute two types of instructions; one set defined to operate on integer data types and another set defined to operate on floating point data types. In contrast with integers, floating point numbers have fractional components and are typically represented in exponent-significand format. For example, the values 2.15 and −10.5 are floating point numbers while the numbers −1, 0, and 7 are integers. The term "floating point" is derived from the fact that there is no fixed number of digits before and after the decimal point, i.e., the decimal point can float. Using the same number of bits, the floating point format can represent numbers within a much larger range than integer format. For example, a 32-bit signed integer can represent the integers between $-2^{31}$ and $2^{31}-1$ (using two's complement format). In contrast, a 32-bit ("single precision") floating point number as defined by the Institute of Electrical and Electronic Engineers (IEEE) Standard 754 has a range (in normalized format) from $2^{-126}$ to $2^{127} \times (2-2^{-23})$ in both positive and negative numbers.

FIG. 1 illustrates an exemplary format for an 8-bit integer 100. As the figure illustrates, negative integers are represented using the two's complement format 106. To negate an integer, all bits are inverted to obtain the one's complement format 102. A constant 104 of one is then added to the least significant bit (LSB).

FIG. 2 shows an exemplary format for a floating point value. Value 110 a 32-bit (single precision) floating point number. Value 110 is represented by a significand 112 (23 bits), a biased exponent 114 (8 bits), and a sign bit 116. The base for the floating point number (2 in this case) is raised to the power of the exponent and multiplied by the significand to arrive at the number represented. In microprocessors, base 2 is most common. The significand comprises a number of bits used to represent the most significant digits of the number. Typically, the significand comprises one bit to the left of the radix point and the remaining bits to the right of the radix point. A number in this form is said to be "normalized". In order to save space, in some formats the bit to the left of the radix point, known as the integer bit, is not explicitly stored. Instead, it is implied in the format of the number.

Floating point values may also be represented in 64-bit (double precision) or 80-bit (extended precision) format. As with the single precision format, a double precision format value is represented by a significand (52 bits), a biased exponent (11 bits), and a sign bit. An extended precision format value is represented by a significand (64 bits), a biased exponent (15 bits), and a sign bit. However, unlike the other formats, the significand in extended precision includes an explicit integer bit. Additional information regarding floating point number formats may be obtained in IEEE Standard 754.

When a numeric value approaches zero, normalized floating-point format may not be able to express the value accurately. To accommodate these instances, x86-compatible microprocessors support a "denormal" format in which the significand contains one or more leading zeros. Denormal values have biased exponents fixed at their smallest possible value (i.e., zero). The leading zeros of denormals permit smaller numbers to be represented.

FIG. 3 shows a denormal value 130 in single precision format. As the figure illustrates, denormal values have a biased exponent 134 equal to zero and a non-zero significand 132. Denormals may be positive or negative (as indicated by sign bit 136).

Microprocessors that are x86 compatible and support floating point instructions must be able to load, store, and operate on denormalized real numbers. This presents several problems for microprocessor designers. One problem in particular relates to loading and manipulating the denormal value in the floating point unit. To improve performance, microprocessors are typically designed with a number of "execution units" that are each optimized to perform a particular set of functions or instructions on a particular data type. For example, one or more execution units within a microprocessor may be optimized to perform arithmetic functions on integer values, while a second set of execution units may be optimized to perform arithmetic functions on floating point values. These floating point execution units (combined with their supporting control logic) may be collectively referred to as the microprocessor's "floating point unit".

Most floating point units translate floating point numbers into a processor-specific internal format before the numbers are operated upon. Using one format for all internal floating point calculations advantageously reduces the complexity of the floating point unit's execution units.

FIG. 4 shows one possible internal floating point format 170 comprising a 68-bit significand 172, an 18-bit biased exponent 174, and a sign bit 176. The use of a single internal floating point format tends to simplify the hardware used to implement the floating point unit. For example, instead of having to process three different formats (i.e., single-precision, double-precision, and extended precision), the floating point processor may translate all floating point values into extended precision format or an internal format. Once the desired operations have been performed, the results are then translated back to the desired format.

The problem denormal values pose to designers relates to translating denormals into this internal format. Normal values may be translated by simply shifting in constant zeros and adjusting the exponent. This conversion process may be performed in a single clock cycle. With denormals, however, the conversion process takes longer because the number must be normalized after the constants are shifted in. For example, in some microprocessors at least two clock cycles are needed to convert the denormal to a normalized internal format.

Since the number of clock cycles needed to process normals and denormals varies, designers are left with a quandary. The designers can make all loads take two clock cycles, but this is undesirable because normal loads are more common than denormal loads. Thus, overall microprocessor performance may suffer due to the unnecessary additional latency incorporated into normal loads.

Another alternative that has been used by designers is to detect the denormal, stall the pipeline, and then trap to microcode to convert the denormal. Yet another alternative is to tag the denormal and then convert it later when it reaches an execution unit. However, these solutions are slow (i.e., the original instruction may need to be re-executed after the denormal is converted) and may reduce the throughput of floating point operations when even a few denormal loads are experienced. Thus an efficient method for rapidly handling denormal loads is desired.

SUMMARY

The problems outlined above may at least in part be solved by a microprocessor configured to dynamically switch its floating point load pipeline length from one stage in length to more than one stage in length. In one embodiment, the microprocessor may accomplish this by performing normal loads and detect denormal loads in a single clock cycle. The microprocessor may temporarily store each floating point instruction in a reissue buffer for at least one clock cycle in anticipation of a denormal load. When a denormal load is detected, the microprocessor is configured to add one or more stages to the floating point load pipeline (e.g., adding a normalization stage to the conversion stage) to allow the denormal value to complete the conversion to internal format. The longer pipeline will then be used for all loads that follow the denormal load until there is a clock cycle without a load (e.g., an idle clock cycle or an clock cycle in which an abort occurs). At that point, the pipeline reverts to its original single stage format. In addition, the microprocessor may be configured to cancel any recently scheduled instructions (e.g., those were scheduled assuming the denormal load would take only one clock cycle to complete). The canceled instructions are then "replayed" (i.e., rescheduled) during a later clock cycle from the reissue buffer. Advantageously, this configuration allows the common case of a normal load to be performed using a short pipeline, while still providing proper handling of the less frequent case of a denormal load.

In one embodiment, the microprocessor may be configured with a floating point classification unit, a floating point conversion unit, and a reissue buffer. The classification unit is configured to receive floating point data from floating point load operations and then determine the floating point data's type. For example, the classification unit may determine whether the floating point data is normal or denormal. The classification unit may also be configured to assert a denormal control signal if the floating point data is denormal.

The conversion unit is configured to receive floating point data that was read from memory as the result of floating point load instructions. The conversion unit is then configured to convert the floating point data from the format that is was originally stored in memory into a predetermined internal format. For example, the predetermined format may be extended precision or a processor-internal format having additional bits allocated for the significand and the exponent. Advantageously, the internal format may allow the representation of denormal values in a normalized form. The conversion unit is configured to convert the floating point data to the predetermined format in a first number of clock cycles (e.g., one clock cycle) if the floating point data is normal. If the floating point data is denormal, however, the conversion unit is configured to use a second larger number of clock cycles (e.g., two clock cycles) to allow for normalization of the denormal value.

The reissue buffer is configured to store floating point instructions as they are scheduled for execution. For example, if three instructions are scheduled for execution in a particular cycle, those three instructions are stored in the reissue buffer. The instructions are stored for at least one clock cycle. Upon receiving the asserted denormal control signal, the reissue buffer may "replay" or reschedule the stored instructions during a subsequent clock cycle. The asserted denormal control signal may also serve as a cancel signal to prevent the originally scheduled instruction from completing or from storing its results.

In another embodiment, the microprocessor may further comprise a scheduling unit capable of scheduling instructions in an out of order fashion. The scheduling unit may be configured to schedule floating point instructions for execution (once the instructions' operands are ready) assuming the conversion unit will perform conversions in the first (smaller) number of clock cycles. In some embodiments, the scheduling unit may be configured to cancel one or more recently scheduled instruction upon receiving an asserted denormal control signal. Canceling the instructions is desirable because they were scheduled assuming the conversion of data (which they may depend upon) would be completed in the first number of clock cycles. The scheduling unit may then replay the canceled instruction (using the information stored in the reissue buffer) during a subsequent clock cycle when their corresponding floating point data is actually available in the normalized internal format.

In the conversion unit, the number of clock cycles used may correspond to the number of pipeline stages used to perform the conversion process. For example, the conversion unit may be configured to employ a first number of pipeline stages to convert normal values and a second greater number of pipeline stages to convert denormal values. However, once a denormal has been converted, the conversion unit may be configured to continue to use the second larger number of clock cycles (or pipeline stages) until the conversion unit has an idle clock cycle or receives an abort signal. The conversion unit may then reset itself to use the first number of clock cycles (or pipeline stages). An idle clock cycle may occur when no load data is received by the conversion unit. An abort signal may be received if the microprocessor detects a branch misprediction.

A method for loading denormal floating point values into a microprocessor is also contemplated. In one embodiment, the method comprises reading floating point data from a data bus and then classifying the floating point data as denormal or normal (or another data type, e.g., MMX). If the floating point data is normal, then it is converted to a predetermined normalized internal format in a first number of clock cycles. If, on the other hand, the floating point data is denormal, then the data is converted to the predetermined normalized internal format in a second larger number of clock cycles to allow extra time for normalization. Once a denormal is converted to internal format, however, all subsequent floating point data conversions are then performed using the second larger number of clock cycles. Thus, if a normal floating point value immediately follows a denormal floating point value, then for scheduling purposes the normal floating point value will be available after the second number of clock cycles (even though the conversion unit may only need the first number of clock cycles to convert the value). In this way the conversion unit switches from a short (e.g., one stage) pipeline to a longer (e.g., two stage) pipeline upon detecting a denormal value. The conversion unit then continues to use the longer pipeline until an idle cycle or an abort is received (at which time is resets itself to the shorter pipeline).

The method may further comprise scheduling floating point instructions for execution assuming that all floating point loads will be converted into internal format in the first (smaller) number of clock cycles. Once a denormal format value is decoded, however, scheduling is performed assuming that all floating point loads will be converted into internal format in the second (larger) number of clock cycles. After an idle clock cycle or abort, scheduling once again resumes the assumption that floating point loads be converted into internal format in the first (smaller) number of clock cycles.

The method may further comprise: (a) temporarily storing instructions as they are scheduled for execution; (b) canceling one or more instructions scheduled for execution once a denormal load is detected or classified; and (c) replaying the canceled instructions one or more clock cycles after the instructions were canceled.

A computer system configured to efficiently perform denormal loads is also contemplated. In one embodiment the computer system may comprise a system memory, a communications device for transmitting and receiving data across a network, and one or more microprocessors coupled to the memory and the communications device. The microprocessors may advantageously be configured as described above.

BRIEF DESCRIPTION OF THE DRAWINGS

Other objects and advantages of the invention will become apparent upon reading the following detailed description and upon reference to the accompanying drawings.

Figure 1:
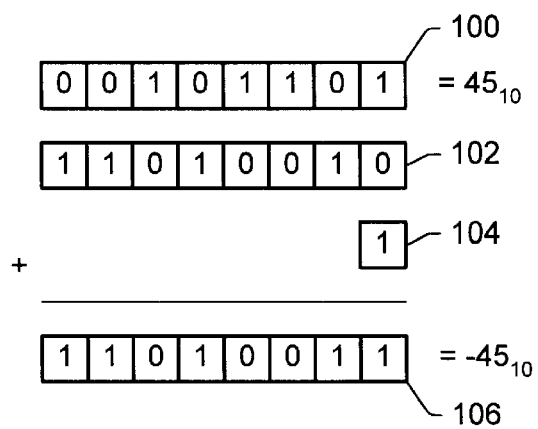
FIG. 1 illustrates an exemplary format for an integer.
Figure 2:
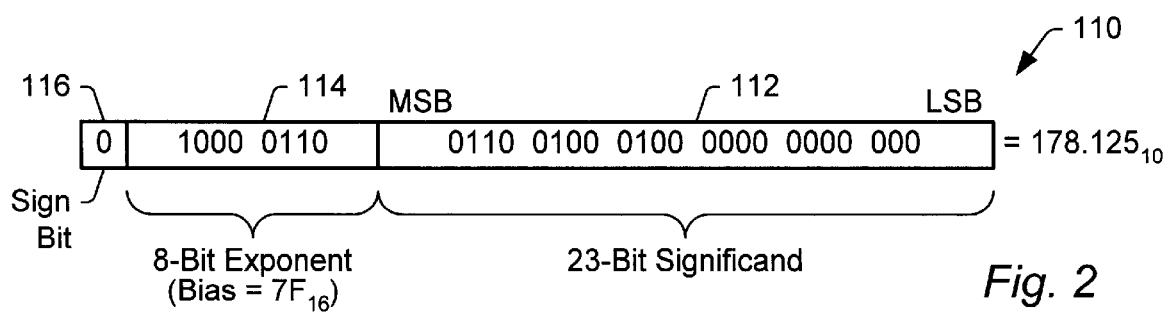
FIG. 2 shows an exemplary format for a floating point value.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Microprocessor

Figure 5:
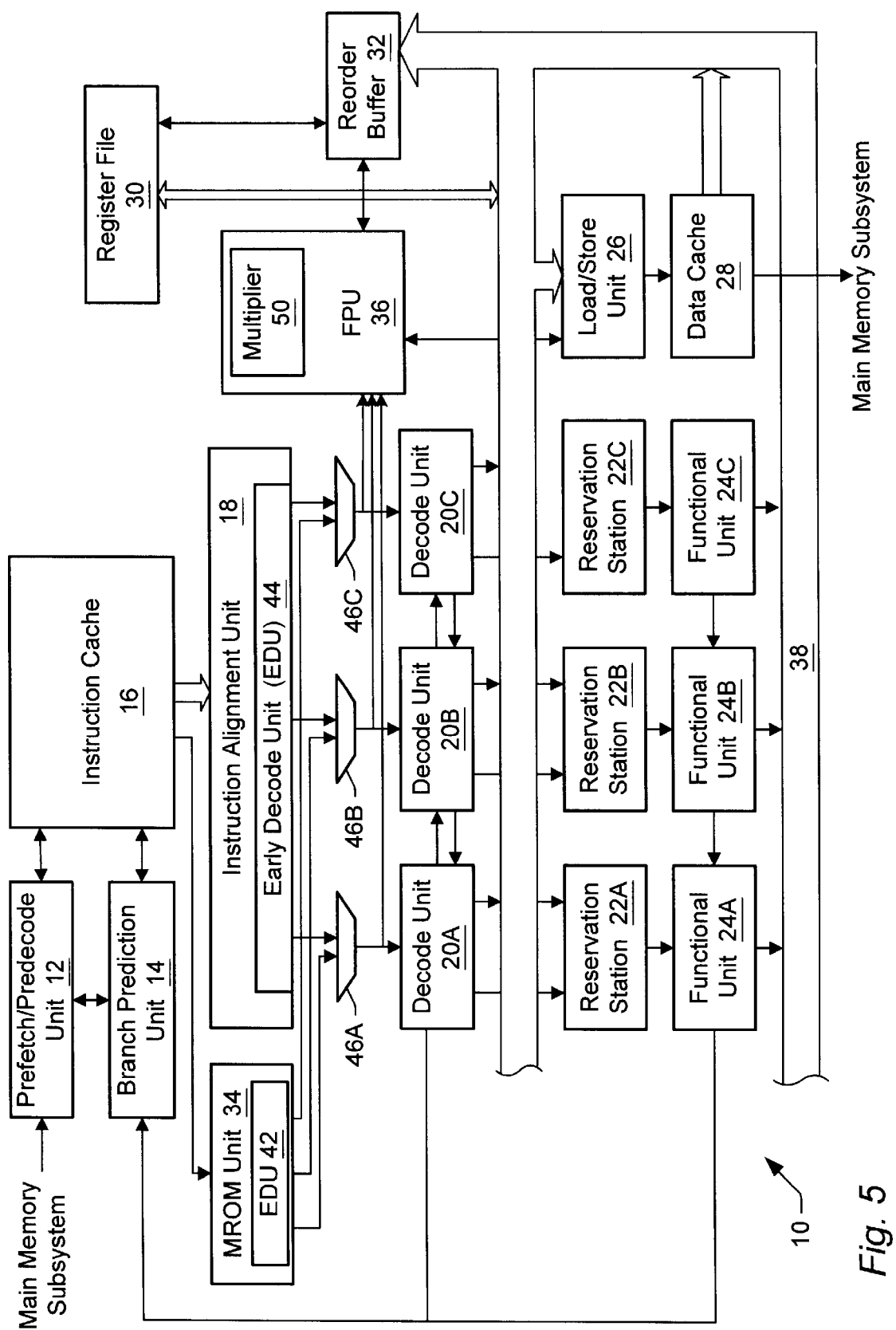
FIG. 5 is a block diagram of one embodiment of an exemplary microprocessor.

Turning now to FIG. 5, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point unit (FPU) 36, which in turn comprises multiplier 50. Before examining one embodiment of FPU 36 in detail, the operation of microprocessor 10 will be briefly discussed. Note that elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18, which comprises an early decode unit (EDU) 44, is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34, which also comprises an early decode unit (EDU) 42, is coupled to decode units 20 and FPU 36. Finally, FPU 36 is coupled to load/store unit 26 and reorder buffer 32.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2-way set associative structure having 64-byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 may predict the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented in a fully-associative, set-associative, or direct-mapped configuration.

Instructions are fetched from main memory and stored into instruction cache 16 by prefetch/predecode unit 12. Instructions may be prefetched prior to the request thereof in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction may be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will now be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate data byte would have start, end, and functional bits as follows:

| Start bits | 10000 |
| End bits | 00001 |
| Functional bits | 11000 |

According to one particular embodiment, early identification that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 may employ branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18 and MROM unit 34. As instructions are fetched from instruction cache 16, the corresponding predecode data is scanned to provide information to instruction alignment unit 18 and MROM unit 34 regarding the instructions being fetched. Instruction alignment unit 18 utilizes the scanning data to align an instruction to each of multiplexers 46A–C. In one embodiment, instruction alignment unit 18 aligns instructions from three sets of eight instruction bytes to decode units 20. Similarly, MROM unit 34 is configured to output up to three aligned instructions to multiplexers 46A–C. Note, both instruction alignment unit 18 and MROM unit 34 may each have an early decode unit (EDC) 42 and 44. These units may perform the first steps of the decoding process, e.g., identifying the operand specifiers for each instruction. These units may also begin the process of loading the desired operands from memory (if necessary).

Each multiplexer 46A–C is configured to receive a partially decoded instruction (and corresponding decode and predecode information) from instruction alignment unit 18 and MROM unit 34. Each multiplexer 46A–C is configured to select up to one instruction from either instruction alignment unit 18 or MROM unit 34 during each clock cycle. The selected instructions are routed to decode units 20A–C (integer instructions), and FPU 36 (floating point, MMX, and 3DX instructions). In one embodiment of microprocessor 10, up to three floating point/MMX/3DX instructions per clock cycle may be conveyed to floating point unit 36. As note above, the instructions may come from MROM unit 34 (microcode instructions) or instruction alignment unit 18 (fast path instructions).

Decode units 20 are configured to complete decoding instructions received from multiplexers 46A–C. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

Figure 3:
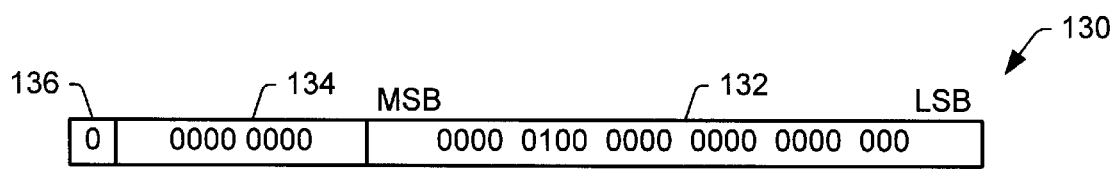
FIG. 3 shows a denormal value in single precision format.
Figure 4:
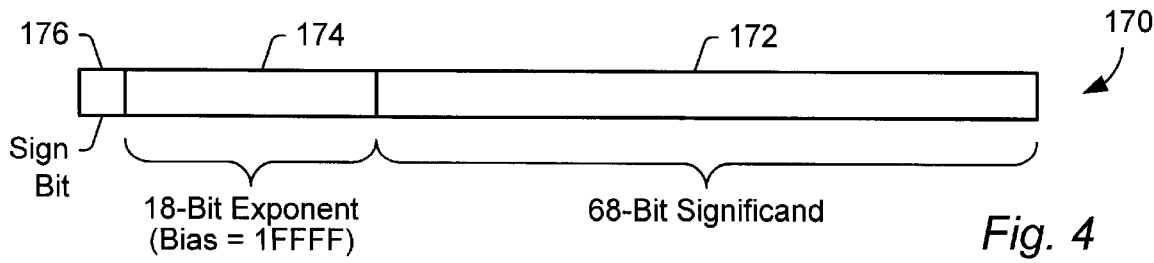
FIG. 4 shows one embodiment of an internal normalized floating point data format.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 3, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit waits until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Floating Point Unit

Figure 6:
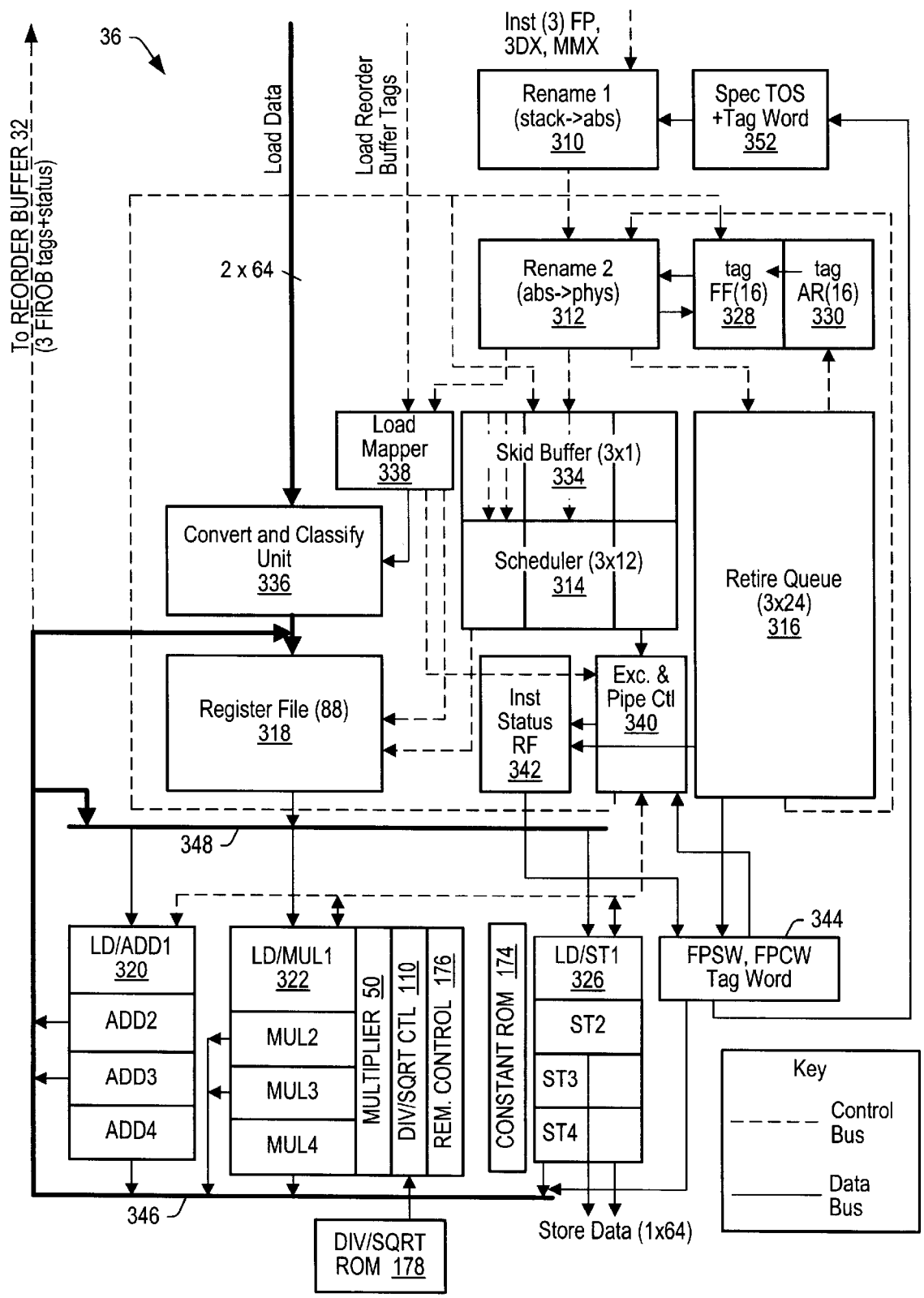
FIG. 6 is a block diagram of one embodiment of the floating point unit from the microprocessor of FIG. 5.

Turning now to FIG. 6, details of one embodiment of FPU 36 are shown. Other embodiments are possible and contemplated. FPU 36 is a high performance out-of-order execution unit capable of accepting up to three new instructions per clock cycle. The three instructions may be any combination of x86 floating point instructions, MMX instructions, or 3DX instructions. MMX and 3DX instructions are extensions to the standard x86 instruction set. One example of a 3DX instruction set extension is the 3DNow!™ extension from Advanced Micro Devices, Inc. MMX instructions are geared toward multimedia and two-dimensional graphic applications, while 3DX instructions are optimized for performing three-dimensional graphic manipulations such as rendering and texture mapping. Many 3DX instructions are vectored instructions that perform the same operation on a number of independent pairs of operands.

As the figure illustrates, this embodiment of FPU 36 comprises the following components: a rename-1 unit 310, a rename-2 unit 312, a scheduler 314, a retire queue 316, a register file 318, a load/add instruction pipeline 320, a load/multiply instruction pipeline 322, a load/store instruction pipeline 326, a skid buffer 334, a convert and classify unit 336 and a load mapper 338. Rename-1 unit 310 is coupled to rename-2 unit 312 and is configured to receive a speculative top of stack (TOS) tag and tag word 352. Rename-2 unit 312 is coupled to future file tag array 328, architectural tag array 330, retire queue 316, skid buffer 334, scheduler 314, and load mapper 338. Convert and classify unit 336 is also coupled to load mapper 338, which in turn is coupled to execution and pipe control unit 340 along with instruction status register file 342 and scheduler 314. Register file 318 receives inputs from convert and classify unit 336, load mapper 338 and scheduler 314, and outputs data to source operand bus 348. Source operand bus 348 is in turn coupled to instruction pipes 320, 322, and 326. Finally, instruction pipes 320, 322, and 326, and floating point status/control/tag words 344 are all coupled to result bus 346. While floating point status/control/tag words 344 and speculative top of stack and tag word 352 are shown separately in the figure for explanatory purposes, these tags may be stored together with future file tags 328 and architectural register tags 330 in a single storage location, e.g., within register file 318, execution and pipe control unit 340, or retire queue 316.

Rename-1 unit 310 receives up to three instructions per clock cycle. As previously noted, these may be any combination of floating point, MMX, or 3DX instructions. Rename-1 unit 310 converts stack-relative register operands into absolute register operands. The x86 instruction set and architecture defines eight floating point registers that are accessed in a stack-like manner (i.e., relative to a top-of-stack pointer). For instructions with memory operands, e.g., FLD instructions (floating point load) a designated destination register can be assigned. Rename-1 unit 310 also assigns each instruction to one of three instruction pipelines, either load/store pipeline 326, add pipeline 320, or multiply pipeline 322.

Rename-2 unit 312 performs true register renaming. Upon receiving the instructions from rename-1 unit 310, rename-2 unit 312 reads three register tags from a "free list" of the available registers stored within retire queue 316. Once the registers have been read, rename-2 unit 312 assigns one to the destination register of each instruction. To rename the source registers, rename-2 unit 312 indexes tag future file 328 using the absolute register number for each source register. Tag future file 328 stores tags that identify which registers store the current speculative future state of each of the sixteen architectural registers in FPU 36. Similarly, architectural register tag file 330 stores tags which identify which registers within register file 318 store the current architectural (non-speculative) state of FPU 36. Note, of the sixteen registers that define FPU 36's state (architectural or speculative), eight are architectural registers (i.e., floating point stack or MMX registers) and eight are micro-architectural registers (i.e., registers that store internal state information that is not generally accessible to the programmer). The old destination register tags are then read from the tag future file 328 and written to the tail of the free list. Finally, tag future file 328 is updated by storing tags for the new destination registers.

Memory operands may be handled by assigning them the same register tag as the destination register. This is because load data will be converted and directly written into the destination register when it is received from load/store pipeline 326. In the case of an FLD instruction (i.e., a floating point load instruction), no further execution is required, although the FLD instruction is still assigned to an execution pipeline for the purpose of handling exceptions and signaling completion to reorder buffer 32.

Once the three instructions have passed through rename-1 unit 310 and rename-2 unit 312, the instructions are represented in a three operand format (i.e., first source operand, second source operand, and destination operand). While the first source operand is always a register operand, a bit in the opcode may be used to indicate whether the second operand is a register operand or a memory operand.

From rename-2 unit 312 the instructions are passed to scheduler 314, where the three instructions are allocated a "line" of storage. If scheduler 314 is full, the instructions may be stored in skid buffer 334 until such time as there is room within scheduler 314. After receiving the three instructions, scheduler 314 snoops result bus 346 and source operand bus 348. Concurrently with allocating the line of storage and snooping, retire queue 316 allocates one entry for each instruction. The entries store the destination register tags, the absolute destination register number, and the old destination register number. Additional information may also be included, e.g., information that may be needed to update the architectural state at retire time.

On the cycle following their entry into scheduler 314, the instructions are available for scheduling. Scheduler 314 (also referred to herein as schedule unit 314) examines all of the stored instructions and issues the oldest instructions which meet the following criteria: (1) the instruction pipe to which the instruction has been assigned is available, (2) the result bus for that instruction pipe will be available on the clock cycle in which the instruction will complete (this is dependent upon the latency of the particular instruction), and (3) the instruction's source registers and or memory operands are available. In this embodiment, scheduler 314 may schedule up to three instructions per clock cycle. As used herein, scheduling refers to conveying instructions from the scheduler to their corresponding execution pipelines. Each of the three instruction pipes 320, 322, and 326 may accept a new instruction every clock cycle. Other embodiments capable of scheduling four or more instructions are also possible and contemplated.

Once all three entries in a line are scheduled, that line is free to be compacted out of scheduler 314. When the instructions are conveyed from scheduler 314 to their respective instruction execution pipeline, their source operands are read. In some cases, the source data will come from a register, while in other cases the source data will come from a "bypass". A bypass refers to the practice of result forwarding. Result forwarding involves conveying the results from a recently executed instruction directly to other instructions that depend upon that result. Using result forwarding allows the result to be used in subsequent instructions without having to wait for the result to be stored in a register and then read from the same register.

Each instruction execution pipe 320, 322, and 326 may be configured as a four-stage pipeline. In the first stage of each pipeline, the result buses are read and the input data is taken from either the source operand bus (if the data is within register file 318) or the result bus (if a bypass is being performed). Once the source data has been received, each instruction pipe may begin performing the appropriate computation.

In the embodiment shown in the figure, instruction pipe 320 is configured to perform load and addition operations, instruction pipe 322 is configured to perform load and multiplication operations, and instruction pipe 326 is configured to perform load and store operations. Both instruction pipes 320 and 322 may be configured to perform certain MMX instructions. Instruction pipe 322, which comprises multiplier 50, may also be configured to perform iterative calculations that involve multiplication, e.g., reciprocal operations, division operations, and square root operations, under the control of control unit 110, division/square root ROM 178, and, if a remainder is called for, remainder control unit 176. Constant ROM 174 is a read only memory configured to store a plurality of constants for instructions such as FLDPI (load constant), for transcendental computations, for self-checking, and for certain special and exceptional results. Division/square root ROM 178 is a read only memory which stores constants used to determine initial values for division and square root computations and constants returned by certain 3DNow! instructions. Control unit 110 provides sequence information for division and square root functions. Note, in some embodiments control unit 110 may be part of execution and pipe control unit 340.

In some cases, instruction operands or the results generated by executing an instruction may be too small to fit within the operand or result's standard data format. These numbers are referred to as "denormals". While normalized floating point values have a non-zero exponent and a one in the most significant bit of the significand, i.e., the bit directly to the left of the binary radix point (e.g., 1.001010 . . . ), denormals are represented with a zero exponent and a zero in the most significant bit of the significand (e.g., 0.000101 . . . ). Denormal load data is detected and tagged by convert and classify unit 336. Denormal results generated by during execution within instruction pipes 320, 322, and 326 are tagged when they are generated. Execution and pipe control unit 340 detects the presence of the denormal tags and calls an appropriate microcode routine from MROM 34 to handle the denormal data.

At the end of the final execution stage, the data is placed on result bus 346. This makes the result data available for an instruction entering the first stage of one of the instruction execution pipelines during the next clock cycle. Once the data is on the result bus, it may also be written into register file 318. Instead of being stored in register file 318, store data is sent to the load/store unit 26. The reorder buffer tag and any exception information is sent back to reorder buffer 32. At this point, the instructions are complete. However, they are still speculative. When the instructions reach the bottom of reorder buffer 32 (assuming there is no branch misprediction or exception abort), reorder buffer 32 notifies FPU 36 that the instructions should be retired. The speculative state of the floating point unit 36 is committed to the architectural state when retire queue 316 updates the tags for the architectural register file 328, and the destination register tags in retire queue 316 are written to the architectural register file 318.

Convert and classify unit 336 receives all load data, classifies it by data type, and converts it to an internal format if necessary. In one embodiment, convert and classify unit 336 appends a three bit classification tag to each data item. The three bit tag classifies the accompanying data as one of the following eight potential data types: (1) zero, (2) infinity, (3) quiet NaN, (4) signaling NaN, (5) denormal, (6) MMX, (7) normal, or (8) unsupported. NaN is a standard abbreviation for "Not-a-Number". While representations may vary across different implementations, zero data types are typically represented with a zero exponent and a zero significand. Similarly, infinity data types are typically represented with an exponent comprising all asserted ones. A quiet NaN ("QNaN") is generated whenever a floating point instruction causes an invalid operation, e.g., a square root operation on a negative number. A signaling NaN ("SNaN"), unlike a quiet NaN, generates an exception when used. Signaling NaNs are not generated by FPU 36 and are typically only used by programmers to signal particular error conditions. The table below illustrates the typical characteristics of each data type for x86 compatible floating point units (wherein "x" represents either a one or a zero):

| Sign | Exponent | Significand | Value |
|------|----------|-------------|-------|
| x | $00 \ldots 00_2$ | $0.00 \ldots 00_2$ | Zero |
| x | $11 \ldots 11_2$ | $1.00 \ldots 00_2$ | Infinity |
| x | $11 \ldots 11_2$ | $1.1xx \ldots xx_2$ | QNaN |
| x | $11 \ldots 11_2$ | $1.0xx \ldots xx_2$ | SNaN |
| x | $00 \ldots 00_2$ | $0.xx \ldots xx_2$ | Denormal |

MMX data types are 64 bits wide and comprise either eight packed 8-bit bytes, four packed 16-bit words, or two packed 32-bit double-words. MMX data types may be detected by the MMX opcodes which precede them. Normal data types are standard floating point values that are either single precision, double precision, or extended precision (before they are translated into an internal data format) and that do not have the characteristics of any of the previously described data types. Unsupported data types are extended precision bit patterns that do not fall into any of the previously described data types and that fall outside of the normal data type as defined by IEEE Standard 754. For example, an extended precision bit sequence having a 0 sign bit, a biased exponent of 11 . . . 11, and a significand in the format (f.ff . . . ff) of 0.11 . . . 11 is an unsupported value. Note, however, in other embodiments larger or smaller classification tags and additional or fewer data types may be implemented.

The data types and exemplary formats illustrated above describe the data as it is received and identified by convert and classify unit 336. Once convert and classify unit 336 classifies the data, the classification tag may be used to identify some or all of the data's properties. For example, if a value is classified as a zero, it may be identified solely by its classification tag instead of having to perform a wide comparison of each bit in the exponent and significand portions of the value. The classification tags may accompany the data throughout FPU 36 and may be stored in register file 18 along with the data.

As discussed above, when data from a load instruction is received by FPU 36, the data is routed to convert and classify unit 336. A corresponding reorder buffer tag accompanies the data and is routed in parallel to load mapper 338. As previously noted in the description of microprocessor 10, the reorder buffer tag identifies the sequence in which out of order instructions should be retired (i.e., committed to architectural state). For load instructions, the reorder buffer tag follows the data from load/store unit 26 to FPU 36. Load mapper 338 receives the reorder buffer tag and translates it into a data register tag. The data register tag indicates which data register within register file 318 the corresponding data is to be loaded into.

Execution and pipe control unit 340 tracks the status of each stage in instruction pipes 320, 322, and 326. Execution and pipe control unit 340 contains timing information enabling it to determine the future availability of each instruction pipe. For example, when an FMUL (floating point multiply) instruction begins execution in multiplication instruction pipe 322, control unit 340 uses its stored timing information to notify scheduler 314 that the result will be available for output on result bus 346 four clock cycles later. This timing information allows scheduler 314 to efficiently schedule instruction for execution in instruction pipes 320, 322, and 326. Control unit 320 also tracks the status of each pipe stage, receiving and prioritizing exceptions from instruction pipes 320, 322,.and 326.

FPU status word, control word, and tag word (collectively, words 344) are stored within retire queue 316 and indicate which of the status and control registers within register file 318 contain the FPU's current architectural state. For example, in one embodiment register file 318 may comprise 88 registers, i.e., 16 registers to store the current architectural state of FPU 36 (see below), and 72 speculative registers to store the speculative state of FPU 36. Of the 72 speculative registers, 16 of them store the "current" speculative state. Of each set of 16 registers that store a particular state of FPU 36 (whether the state is architectural or speculative), eight registers are FPU stack registers and eight registers are micro-architectural registers that store state information that is only accessible to microcode instructions within FPU 36, i.e., they are not accessible to the programmer and store only internal state information. In one embodiment, each register in register file 314 is 90 bits long, with 87 bits providing storage for internal format data (e.g., one sign bit, 18 exponent bits, and a 68-bit significand) and 3 class bits.

Instruction status register file 342 stores information for execution and pipe control unit 320. As a result of instructions executing out of order in FPU 36, exceptions that occur within instruction pipes may need to be stored until the instructions generating them are the next to be retired. Retire queue 316 reads instruction status register file 342 when it retires instructions and updates the architectural floating point status word (FPSW) and floating point control word (FPCW) and tag word (collectively, 344) accordingly. This information is conveyed to rename-1 unit along with the current speculative top of stack 352 and on result bus 346.

Figure 7:
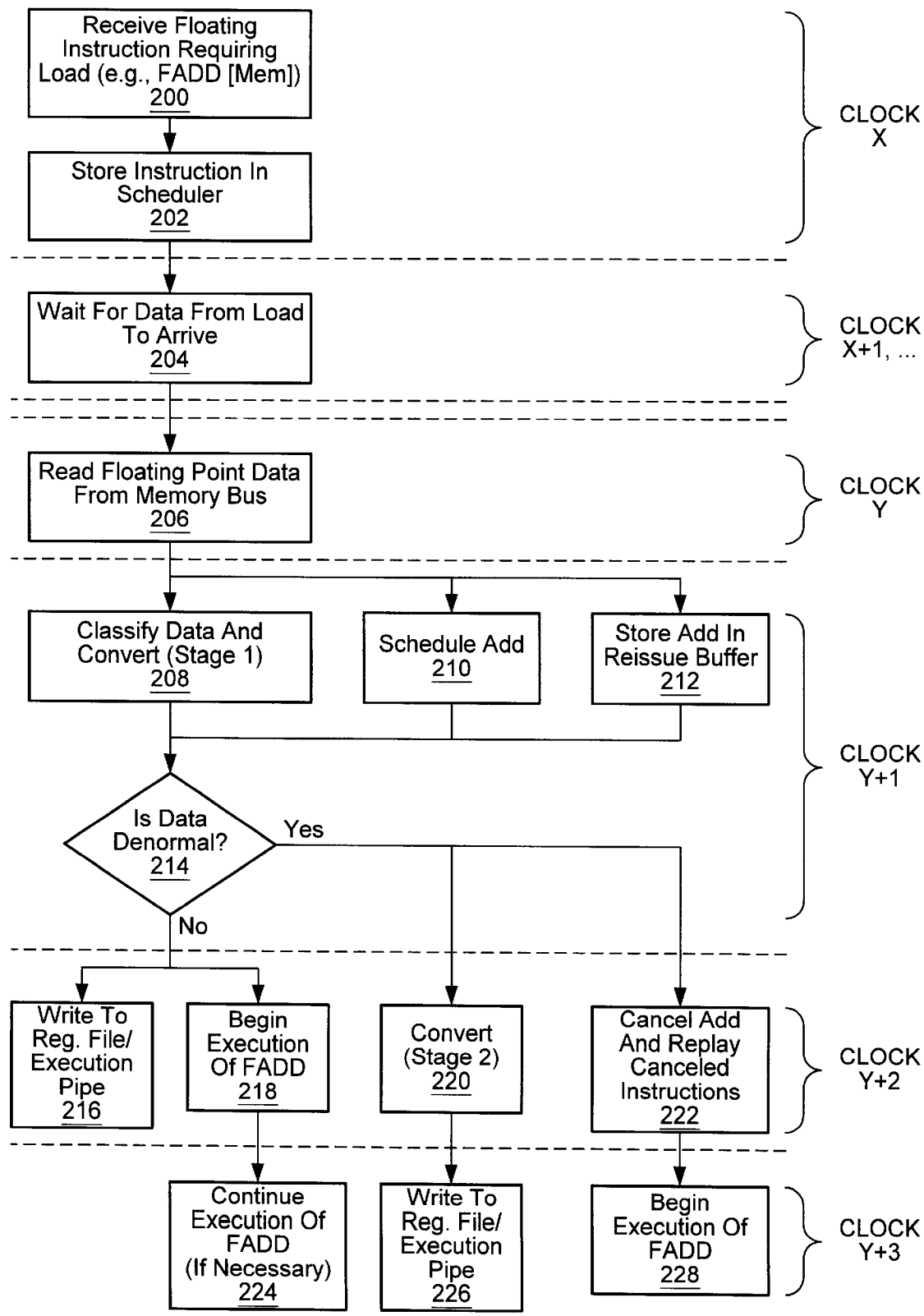
FIG. 7 is a flowchart illustrating one embodiment of a method for efficiently performing normal and denormal floating point loads.

Method for Denormal Load Handling—FIG. 7

FIG. 7 is a flowchart illustrating one embodiment of a method for handling loads of normal and denormal floating point values. First, a floating point instruction is received by the floating point unit (step 200). For example, the floating point unit may receive an FADD [MEM] instruction that adds the contents located at [MEM] in memory to the value currently stored at the top of the register stack. When received, the instruction goes through register renaming (e.g., using rename-I unit 310 and rename-2 unit 312 of FIG. 6) and is then stored in the schedule unit (e.g., scheduler 314 of FIG. 6). The instruction then waits for its memory data to be received by the floating point unit (step 204). This may take any number of clock cycles, depending upon whether the requested data is cached and the latency of the memory subsystem.

In some embodiments, the actual load may be initiated upon instruction decode (e.g., by early decode units 42 or 44 of FIG. 5). When a floating point instruction with a memory operand is fetched from the instruction cache 16, it is allocated a tag (e.g., a reorder buffer tag). Any memory operands associated with the instruction are detected during early decode before the instruction is sent to the floating point unit. Corresponding load instructions are then created and executed (e.g., by load/store unit 26 of FIG. 5). Once the data is received (either from the data cache or memory), it is forwarded to the floating point unit (and convert and classify unit 336 of FIG. 6). Accompanying the data is the reorder buffer tag identifying which instruction the data belongs to. The floating point unit uses this tag to match the data up with the corresponding instruction stored in the scheduler (e.g., using load mapper 338 of FIG. 6).

Thus, a number of clock cycles (e.g., clock cycle Y) later the floating point data is read from memory and forwarded to the floating point unit (step 206). During the next clock cycle (Y+1), the convert and classify unit receives the data and classifies it (step 208). In parallel with classifying the data, the convert and classify unit also converts the floating point data to internal format. If the data is normal, the conversion is completed within this clock cycle. If the data is denormal, the conversion is only partially completed during this clock cycle (i.e., one or more additional clock cycles will be needed for normalization).

In parallel with the conversion and classification, the scheduler receives an indication from the load mapper indicating which instruction in the scheduler corresponds to the data. Once the scheduler receives this indication that the data has been received, the scheduler is able to schedule the FADD instruction for execution (step 210). Depending upon the exact configuration, the scheduler may schedule more than one instruction per clock cycle. In conjunction with scheduling instructions, the scheduler may temporarily store each scheduled instruction in a reissue buffer (step 212). Scheduling an instruction means sending the instruction to the appropriate execution pipeline. For example, in the case of an FADD instruction, this may be LD/ADD1 pipeline 320 (of FIG. 6).

By the end of clock cycle (Y+1), the convert and classify unit has determined whether the data is normal or denormal (step 214). If the data was received in normal format, during the next clock cycle (Y+2) the data is written to the register file (step 216) and provided to the appropriate execution pipeline so that the FADD instruction can begin execution (step 218). Depending upon the type of addition being performed and what rounding mode is selected, the addition may require more than one clock cycle (step 224).

If the floating point data was received in denormal format, then during clock cycle (Y+2) the convert and classify unit completes the denormal to internal format conversion by normalizing the data (step 220). In parallel, either the schedule unit or the convert and classify unit may be configured to issue a cancel signal to the execution pipeline or pipelines that have received instructions from the schedule unit in the previous clock cycle (step 322). Depending upon the embodiment, the cancellation may be selective (i.e., only affecting the instructions that depend upon the data being converted) or may simply cancel all instructions scheduled during the previous clock cycle. During the same clock cycle (Y+2), the canceled instructions are "replayed" or rescheduled using the information stored in the reissue buffer.

During the following clock cycle (Y+3), the converted denormal data (now in normalized internal format) is written to the register file and forwarded to the appropriate execution pipeline or pipelines (step 226). The execution pipeline then begins execution of the FADD instruction using the data provided by the reissue buffer (step 228).

The flowchart illustrated in the figure is for explanatory purposes and is not meant to be limiting. Depending upon the exact implementation, the steps may be performed in a different order and may be performed using a different number of clock cycles than shown in the figure. For example, steps 206 and 208 may be combined into a single clock cycle, or steps 208 and 220 may each be performed in two or more clock cycles. Additional steps may also be added.

Classify and Convert Unit—FIGS. 8–11

Figure 8:
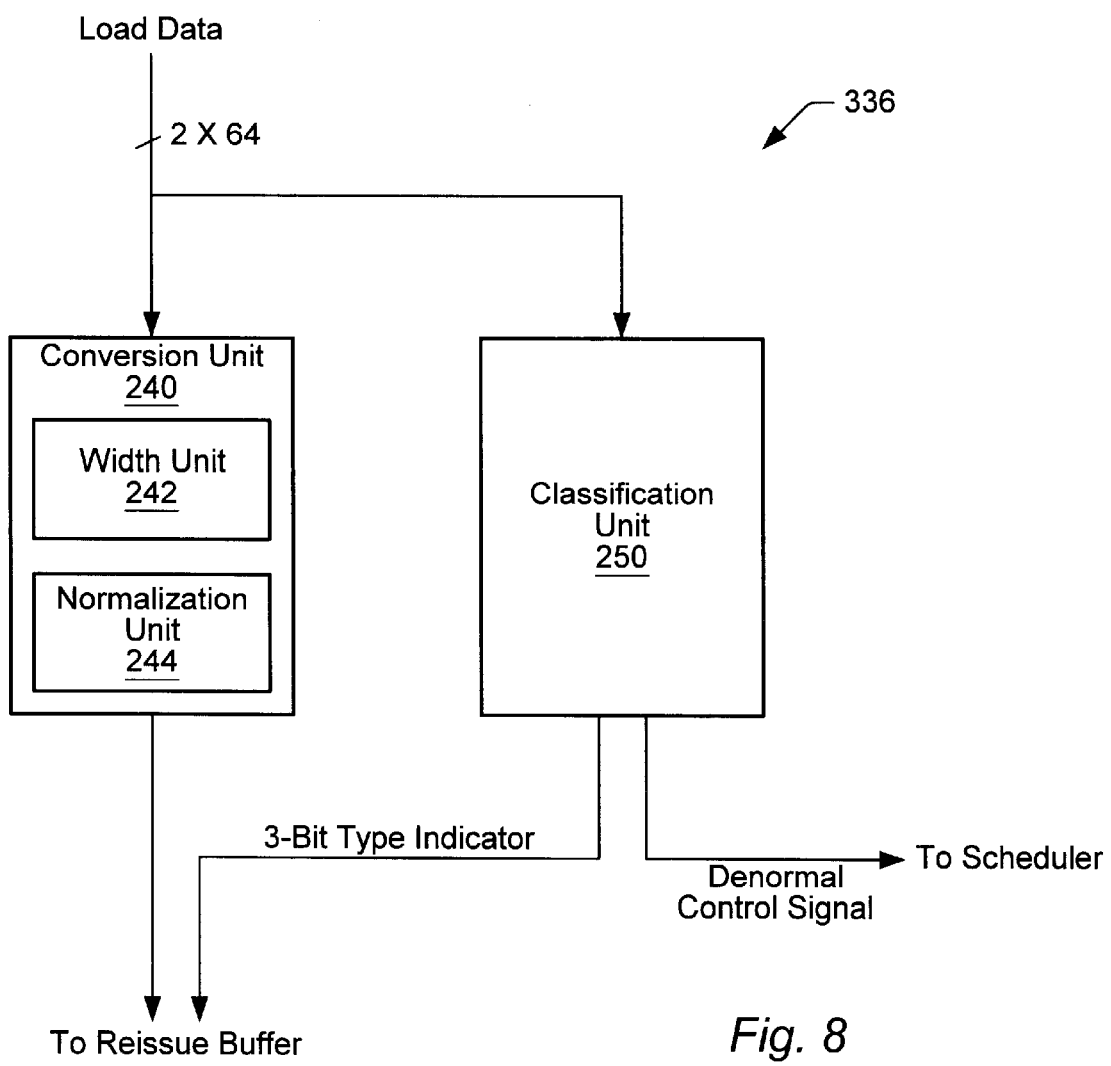
FIG. 8 is a diagram of one embodiment of the convert and classify unit from FIG. 6.

FIG. 8 shows one embodiment of convert and classification unit 336. Convert and classify unit 336 may comprise a conversion unit 240 and a classification unit 250. Conversion unit 240 and classification unit 250 may be implemented as parts of a single unit or as individual units within microprocessor 10 or floating point unit 36. Classification unit 250 is configured receive the load data and generate a 3-bit type indicator and a denormal control signal (asserted when the data is received is in denormal format). As previously described, the three bit tag classifies the accompanying data as one of the following eight potential data types: (1) zero, (2) infinity, (3) quiet NaN, (4) signaling NaN, (5) denormal, (6) MMX, (7) normal, or (8) unsupported. Other classification schemes are also possible. Classification unit 250 may be implemented using comparators or other standard logic or memory (e.g., a ROM).

In one embodiment, conversion unit 240 comprises width adjustment unit 242 and a normalization unit 244. Width unit 242 is configured to pad the received data to the proper width and adjust the exponent to the proper bias. Normalization unit 244 is configured to normalize the received data (if necessary). In one embodiment, width unit 242 is the first stage of the conversion pipeline taking a first number of clock cycles (e.g., one clock cycle). If the data is normal, the data is output after the first stage. If, however, the data is denormal, then the data proceeds to normalization unit 244 as the second stage in the pipeline. In some embodiments, both normal and denormal data may be conveyed to normalization unit 244, but normal data may be examined and output by normalization unit 244 without actually invoking the normalization process.

Figure 9:
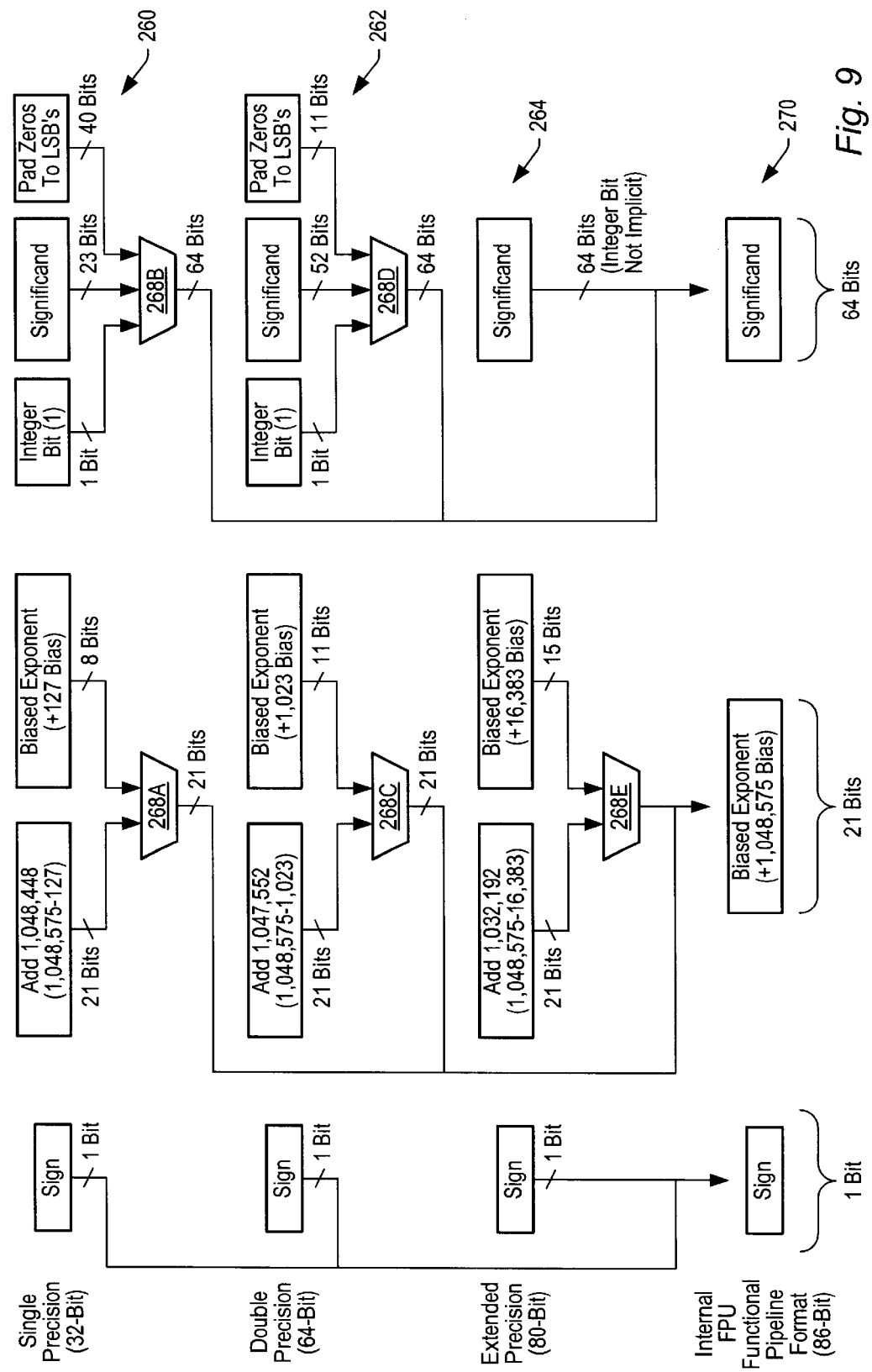
FIG. 9 is a diagram of one embodiment of the conversion unit from FIG. 8.

FIG. 9 illustrates one embodiment of width adjustment unit 242, but other embodiments are also possible and contemplated. Width adjustment unit 242 operates by padding a varying number of zeros into the least significant bits ("lsb") of an operand's significand (if necessary) and adding a constant to the operand's exponent. For a single precision operand 260 and a double precision operand 262, an integer bit is also added. This is not necessary for the extended precision operand 264 because the extended format has an explicit integer bit. Logic units 268B,D combine the significands, the integer bits, and the padding zeros together to form the significand of internal format 270. Other internal formats are possible and contemplated (for example, a 68-bit significand, an 18-bit biased exponent, and a single sign bit).

The exponents are converted to internal format 270 by adding a constant. Logic units 268A,C,E perform the addition. The value of the constant to be added is determined by subtracting the desired bias of the exponent in its final format from the bias of the exponent's original format. The internal format shown may be changed, for example, by using a 20-bit exponent with a 70-bit significand. In addition, other exponent biases are also possible.

Figure 10:
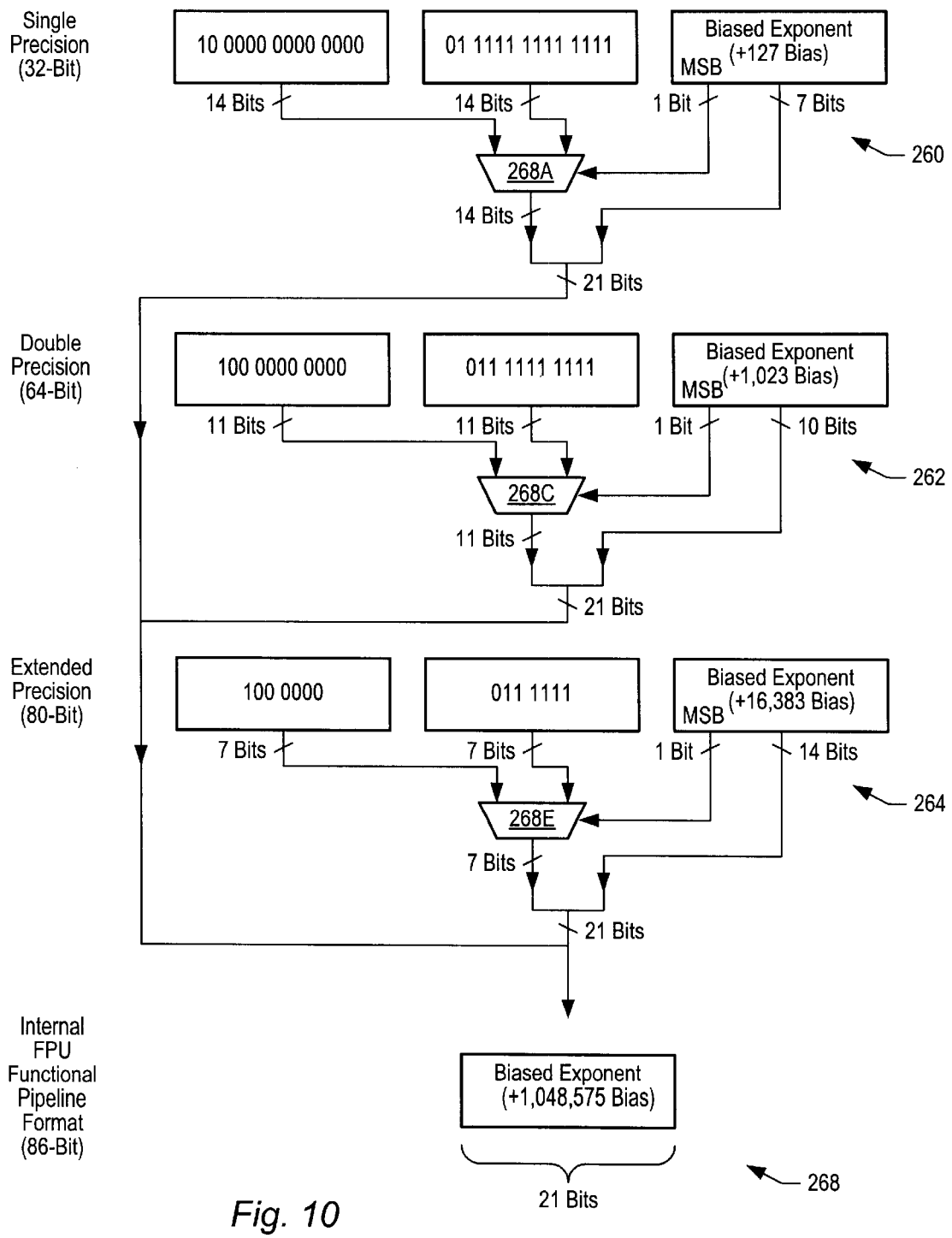
FIG. 10 shows more details of one embodiment of the conversion unit from FIG. 9.
Figure 11A:
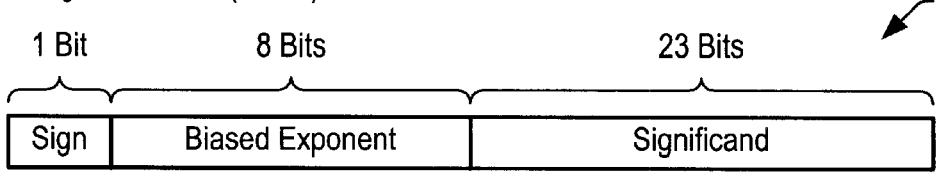
FIG. 11 shows more details of one embodiment of the normalization unit from FIG. 8.
Figure 11A:
Figure 11A:
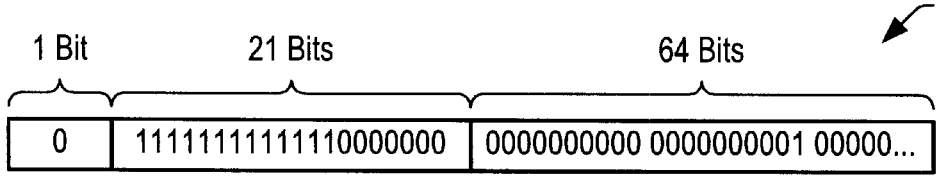
Figure 11A:
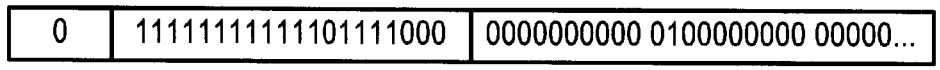
Figure 11A:
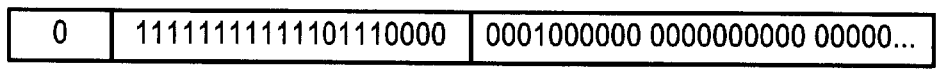
Figure 11A:
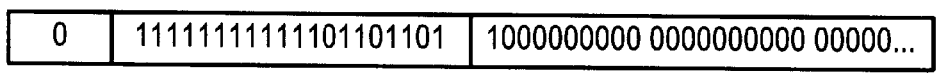
Figure 11B:
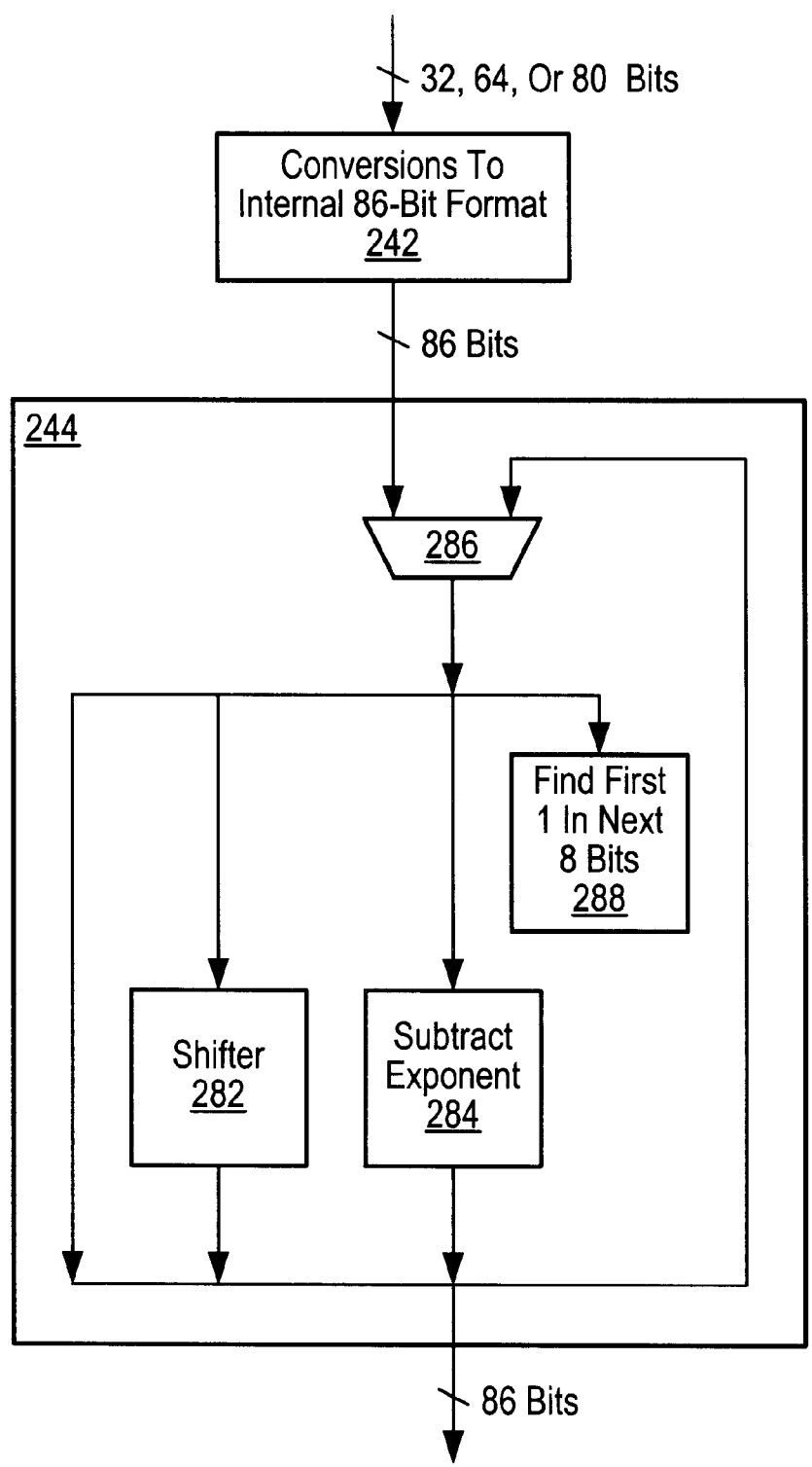

FIG. 10 shows details of one embodiment of the exponent conversion logic units 268A,C,E. Conversion logic units 268A,C,E may be implemented as multiplexers. For example, when converting an exponent in single precision format 260, multiplexer 268A selects one of two constants based upon the value of the most significant bit of the single precision format exponent. The constant is then concatenated with the remaining lesser significant bits of the exponent to form the internal format exponent. Other methods for converting exponents are also possible and contemplated.

FIG. 11 shows details of one embodiment of normalization unit 244. Normalization unit 244 operates by shifting the denormal operand's significand by small amounts which are subtracted from the denormal operand's exponent. Shifter 282 performs the shifting function on the significand, while subtraction unit 284 subtracts the corresponding shift amount from the exponent. The output of shifter 282 and subtraction unit 284 are fed back through normalization unit 244 by multiplexer 286 until a one is detected in the integer bit of the significand (e.g., by detection unit 288). If normalization unit 244 receives a value that is already normalized, detection unit 288 may cause normalization unit 244 to simply output the data without alteration.

The operation of normalization unit 244 can be illustrated using exemplary single precision denormal 290 in single precision format 260. First, the operand is expanded to an 86-bit internal format 292 by conversion unit 242. Then, the operand is conveyed to normalization unit 244. During the first pass through normalization unit 244, the operand's significand is shifted by eight bits, and the shift amount is subtracted from the operand's exponent. This is represented by intermediary value 294. During the second pass through normalization unit 244, intermediary value 294 is shifted by another eight bits as represented by value 296. During the third pass and final pass through normalization unit 244, intermediary value 296 is shifted by another three bits, thereby normalizing the operand as represented by value 298. In other embodiments the number of bits shifted per cycle may be different (e.g., up to 8 bits per cycle). In some embodiments it may be possible for normalization unit 244 to be run at a higher frequency than the remainder of the microprocessor. In still other embodiments, normalization unit 244 may be configured wide enough to completely normalize the worst case denormal (i.e., all zeros and a single one in the least significant bit of the significand) in a single cycle.

Figure 12:
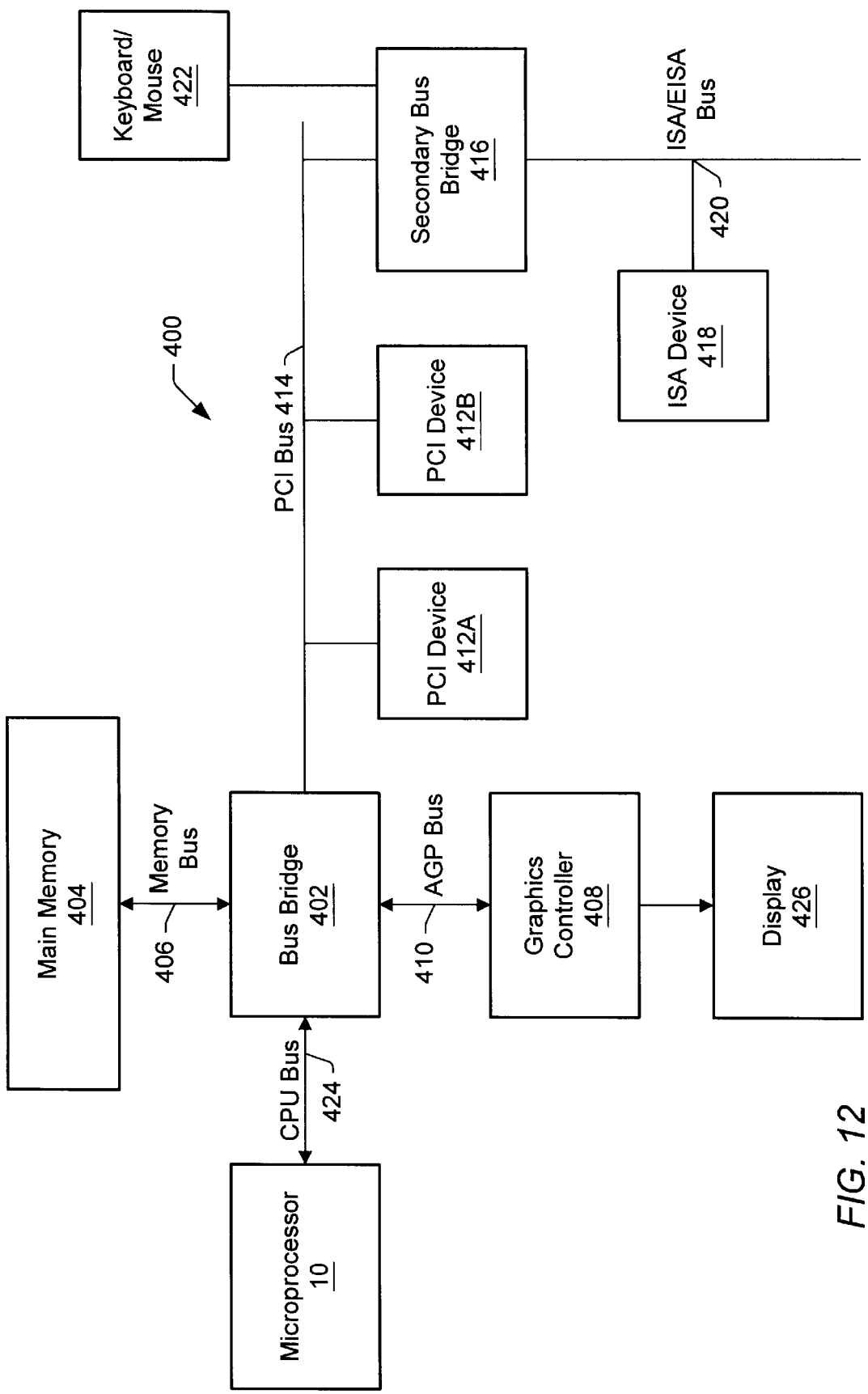
FIG. 12 is a block diagram of one embodiment of a computer system configured to utilize the microprocessor of FIG. 5.

Fxemplary Computer System—FIG. 12

FIG. 12 shows a block diagram of one embodiment of a computer system 400 including microprocessor 10. Microprocessor 10 is coupled to a variety of system components through a bus bridge 402. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus,414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a communications device (e.g., a modem or a network card), a sound card, and a variety of data acquisition cards such as GPIB or field bus interface cards.

Graphics controller 408 is provided to control the rendering of text and images on a display 426. Graphics controller

408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g. microprocessor 10*a* shown as an optional component of computer system 400). Microprocessor 10*a* may be similar to microprocessor 10. More particularly, microprocessor 10*a* may be an identical copy of microprocessor 10. Microprocessor 10*a* may share CPU bus 424 with microprocessor 10 or may be connected to bus bridge 402 via an independent bus.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. A microprocessor configured to execute floating point instructions, the microprocessor comprising:
   a classification unit configured to receive floating point data from floating point load operations and classify the floating point data according to data type, wherein the classification unit is configured to assert a denormal control signal for floating point data that is denormal; and
   a conversion unit configured to receive the floating point data and convert the floating point data to a predetermined format, wherein the conversion unit is configured to convert normal floating point data to the predetermined format in a first number of clock cycles, wherein the conversion unit is configured to convert denormal floating point data to the predetermined format in a second number of clock cycles, wherein the first number of clock cycles is less than the second number of clock cycles; and
   a reissue buffer configured to temporarily store floating point instructions for at least one clock cycle, wherein the reissue buffer is configured to replay the stored floating point instructions in response to receiving the asserted denormal control signal;
   wherein in response to receiving the denormal floating point data, the conversion unit is further configured to convert normal floating point data and denormal floating point data using the second number of clock cycles until the conversion unit experiences an idle clock cycle.

2. The microprocessor as recited in claim 1, wherein the conversion unit will convert and normalize denormal floating point data to the predetermined format in the second number of clock cycles.

3. The microprocessor as recited in claim 1, further comprising a scheduling unit, wherein the scheduling unit is configured to schedule the floating point instructions for execution assuming the conversion unit will complete converting the floating point data corresponding to the floating point instructions in the first number of clock cycles.

4. The microprocessor as recited in claim 3, wherein the scheduling unit is configured to cancel recently scheduled floating point instructions if the conversion unit does not complete converting the floating point data corresponding to the floating point instructions in the first number of clock cycles.

5. The microprocessor as recited in claim 4, wherein the scheduling unit is configured to replay canceled instructions from the reissue buffer.

6. The microprocessor as recited in claim 1, wherein the first number of clock cycles is one, and wherein the second number of clock cycles is two.

7. The microprocessor as recited in claim 1, wherein the conversion unit is configured to employ a first number of pipeline stages to convert normal values to the predetermined format, wherein the conversion unit is configured to employ a second larger number of pipeline stages to convert and normalize denormal values to the predetermined format.

8. The microprocessor as recited in claim 7, wherein the first number of pipeline stages comprises one or more converting pipeline stages, and wherein the second number of pipeline stages comprises the one or more converting pipeline stages and one or more normalizing pipeline stages.

9. The microprocessor as recited in claim 7, wherein the first number of pipeline stages is one, wherein the second number of pipeline stages is two, wherein said first pipeline stage is a conversion stage and wherein said second pipeline stage is a normalization pipeline stage.

10. The microprocessor as recited in claim 1, wherein the conversion unit is further configured to convert all floating point data received after receiving a denormal floating point data using the second number of clock cycles until the conversion unit receives an abort signal.

11. A method for loading denormal floating point values into a microprocessor, the method comprising:
   reading floating point data from a data bus;
   classifying the floating point data as denormal or normal;
   converting the floating point data to a predetermined format in a first number of clock cycles in response to the floating point data being normal;

converting the floating point data to the predetermined format in a second number of clock cycles in response to the floating point data being denormal; and converting subsequent floating point data received after the denormal floating point data in the second number of clock cycles regardless of whether the subsequent floating point data is denormal or normal.

12. The method as recited in claim 11, wherein said converting the floating point data to the predetermined format in a second number of clock cycles further comprises normalizing the floating point data.

13. The method as recited in claim 11, further comprising scheduling floating point instructions assuming the floating point data corresponding to the floating point instructions will be converted in the first number of clock cycles.

14. The method as recited in claim 13, further comprising:
temporarily storing each scheduled floating point instruction in a reissue buffer for one or more clock cycles;
canceling the most recently scheduled floating point instructions in response to determining that the corresponding floating point data is denormal; and
replaying the canceled instructions from the reissue buffer one or more clock cycles later.

15. The method as recited in claim 13, further comprising reverting to using the first number of clock cycles to convert floating point data after an abort or after one or more clock cycles lapse without receiving any floating point data.

16. The method as recited in claim 11, wherein the first number of clock cycles is one, and wherein the second number of clock cycles is two.

17. The method as recited in claim 11, further comprising utilizing a first number of pipeline stages to convert the floating point data if the floating point data is normal, and utilizing a second number of pipeline stages to convert the floating point data if the floating point data is denormal, wherein the first number of pipeline stages is smaller than the second number of pipeline stages.

18. The method as recited in claim 14, further comprising using the second number of pipeline stages for normal values loaded after a denormal value but before an abort or a clock cycle without a load.

19. The method as recited in claim 11, wherein the scheduling comprises scheduling multiple floating point instructions per clock cycle, and wherein the predetermined internal format is normalized.

20. A computer system comprising:
a memory;
a communications device for transmitting and receiving data across a network; and
a microprocessor coupled to the memory and the communications device, wherein the microprocessor comprises:
a classification unit configured to receive floating point data from floating point load operations and determine the floating point data's type, wherein the classification unit is configured to assert a denormal control signal in response to the floating point data's type being denormal;
a conversion unit configured to receive the floating point data and convert the floating point data to a predetermined format, wherein the conversion unit is configured to convert the floating point data to the predetermined format in a first number of clock cycles if the floating point data is normal, wherein the conversion unit is configured to convert the floating point data to the predetermined format in a second number of clock cycles if the floating point data is denormal, wherein the first number of clock cycles is less than the second number of clock cycles; and
a reissue buffer configured to temporarily store floating point instructions for at least one clock cycle, wherein the reissue buffer is configured to replay the stored floating point instructions in response to receiving the asserted denormal control signal;
wherein in response to receiving the denormal floating point data, the conversion unit is further configured to convert normal floating point data and denormal floating point data using the second number of clock cycles until the conversion unit experiences an idle clock cycle.

21. The computer system as recited in claim 20, wherein the microprocessor further comprises a scheduling unit configured to schedule floating point instructions for execution assuming the conversion unit will convert the floating point data in the first number of clock cycles, wherein the scheduling unit is configured to cancel the most recently scheduled floating point instruction if the most recently floating point instruction was scheduled for execution during the same clock cycle in which a floating point load is detected as a denormal.

22. A floating point unit comprising:
a means for determining whether received floating point data from floating point load operations is normal or denormal; and
a means for converting the floating point data to a predetermined format, wherein the means for converting comprises a first pipeline and a second pipeline, wherein the means for converting is configured to convert the floating point data to the predetermined format using the first pipeline if the floating point data is normal, wherein the means for converting is configured to convert the floating point data to the predetermined format using the second pipeline if the floating point data is denormal, wherein the means for converting is configured to convert the floating point data to the predetermined format using the second pipeline regardless if the floating point data is normal or denormal if the floating point data follows a denormal without an intervening idle cycle or an intervening abort.

23. The floating point unit as recited in claim 22, further comprising a reissue buffer configured to store floating point instructions for at least one clock cycle, wherein the reissue buffer is configured to replay the currently stored floating point instruction in response to the means for converting receiving a denormal.

* * * * *